US008411926B2

(12) United States Patent
Feng (10) Patent No.: US 8,411,926 B2
(45) Date of Patent: Apr. 2, 2013

(54) CALIBRATION OF A MULTI-PINHOLE SPECT SYSTEM WITHOUT PRE-KNOWLEDGE OF POINT SOURCE MARKERS 3D COORDINATES

(75) Inventor: Bing Feng, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 570 days.

(21) Appl. No.: 12/767,414

(22) Filed: Apr. 26, 2010

(65) Prior Publication Data

US 2010/0272339 A1    Oct. 28, 2010

Related U.S. Application Data

(60) Provisional application No. 61/172,394, filed on Apr. 24, 2009.

(51) Int. Cl.
*G06K 9/00*    (2006.01)
(52) U.S. Cl. .......................... 382/131; 382/154
(58) Field of Classification Search ........................ None
See application file for complete search history.

(56) References Cited

U.S. PATENT DOCUMENTS 5,481,115 A *  1/1996 Hsieh et al. ............. 250/363.04
2008/0116386 A1*  5/2008 Wagenaar et al. ....... 250/370.09

OTHER PUBLICATIONS

V-H Tran et al., Geometry Calibration of a Dual Headed SPECT System, with Rocking Motion Correction, for Small Animal Imaging, IEEE Nuclear Science Symposium Conference Record, 2005, pp. 2089-2093.*
Michel Defrise et al., Perturbative Refinement of the Geometric Calibration in Pinhole SPECT, IEEE Transactions on Medical Imaging, vol. 27, No. 2, Feb. 2008, pp. 204-214.*

* cited by examiner

*Primary Examiner* — Brian P Werner
(74) *Attorney, Agent, or Firm* — Peter Kendall (57) ABSTRACT

A system and method is provided for reconstructing single photon emission computed tomography data acquired with a pinhole collimator without pre-knowledge of 3D coordinates of point source markers. The system and method include reiteratively applying a downhill simplex process to determine a first parameter and a second parameter, keeping a lowest vertex from a previous iteration, randomly resetting starting values for rest vertexes for a current iteration, wherein the lowest vertex is prevented from performing a last iteration, determining whether at least one of a first threshold and a second threshold has been reached, wherein the first threshold comprises a cost function value and the second threshold comprises a predetermined number of iterations of the downhill simplex process, acquiring projection data from the first parameter, determining locations of 2D data from the projection data of the first parameter; and estimating the second parameter by fitting the forward projected data locations to the measured data locations.

20 Claims, 7 Drawing Sheets

CALIBRATION OF A MULTI-PINHOLE SPECT SYSTEM WITHOUT PRE-KNOWLEDGE OF POINT SOURCE MARKERS 3D COORDINATES

CROSS-REFERENCE TO RELATED APPLICATIONS

This is a non-provisional application of pending U.S. provisional patent application Ser. No. 61/172,394, filed Apr. 24, 2009, the entirety of which application is incorporated by reference herein.

FIELD OF THE DISCLOSURE

The present disclosure is related to methods for calibrating Single Photon Emission Computed Tomography (SPECT) data acquired with a multi-pinhole system.

BACKGROUND

Single-pinhole and multi-pinhole SPECT imaging are used increasingly in clinical organ specific studies and pre-clinical studies using small animals. One advantage of pinhole collimation with magnification is sub-millimeter resolution which is not achievable for parallel-beam SPECT. Multi-pinhole SPECT with overlapping counts is also used to improve sensitivity over single-pinhole SPECT.

In order to achieve high resolution, a multi-pinhole SPECT system requires accurate calibration of its geometric parameters. Among the geometric parameters that may need calibrating are the focal length, radius-of-rotation, pinhole locations, pinhole plate transaxial and axial offset (or mechanical offset), detector center-of-rotation offset (or electrical shift), and twisting and tilting of the plate, and so on.

In practice, assumptions can often be made to reduce the number of calibration parameters, based on the knowledge of a specific system. For example, a conventional calibration approach includes acquiring the projection data of point-source calibration markers, finding the locations of the 2D dots on the projection data, and estimating the geometric parameters by fitting the forward-projected dot-locations to the measured dot-locations, or by some analytic methods.

These conventional methods generally require fairly good knowledge of the 3D coordinates of the point-source markers in order to identify most of the dots on the projection data in terms of what point-source through what pinhole, and to pair up measured dots with dots by forward projection. This sorting procedure is called "dots assignment". If there are large errors in the 3D locations of point-sources, the dots assignment may fail for most dots, and the calibration may fail as well.

A CT scan is typically required to determine the 3D locations of the calibration markers. This typically increases the cost and time for medical imaging procedures.

Desirable in the art is an improved method of calibrating a multi-pinhole SPECT system.

SUMMARY

According to a preferred implementation of the present disclosure, a system and method is provided for reconstructing single photon emission computed tomography data acquired with a pinhole collimator without pre-knowledge of 3D coordinates of point source markers. The system and method include reiteratively applying a downhill simplex process to determine a first parameter and a second parameter, keeping a lowest vertex from a previous iteration, randomly resetting starting values for rest vertexes for a current iteration, wherein the lowest vertex is prevented from performing a last iteration, determining whether at least one of a first threshold and a second threshold has been reached, wherein the first threshold comprises a cost function value and the second threshold comprises a predetermined number of iterations of the downhill simplex process, acquiring projection data from the first parameter, determining locations of 2D data from the projection data of the first parameter; and estimating the second parameter by fitting the forward projected data locations to the measured data locations.

According to another embodiment, the pinhole collimator is a multi-pinhole collimator.

BRIEF DESCRIPTION OF THE DRAWINGS

The accompanying drawings illustrate exemplary embodiments of the disclosed method, and in which.

DETAILED DESCRIPTION

Figure 1:
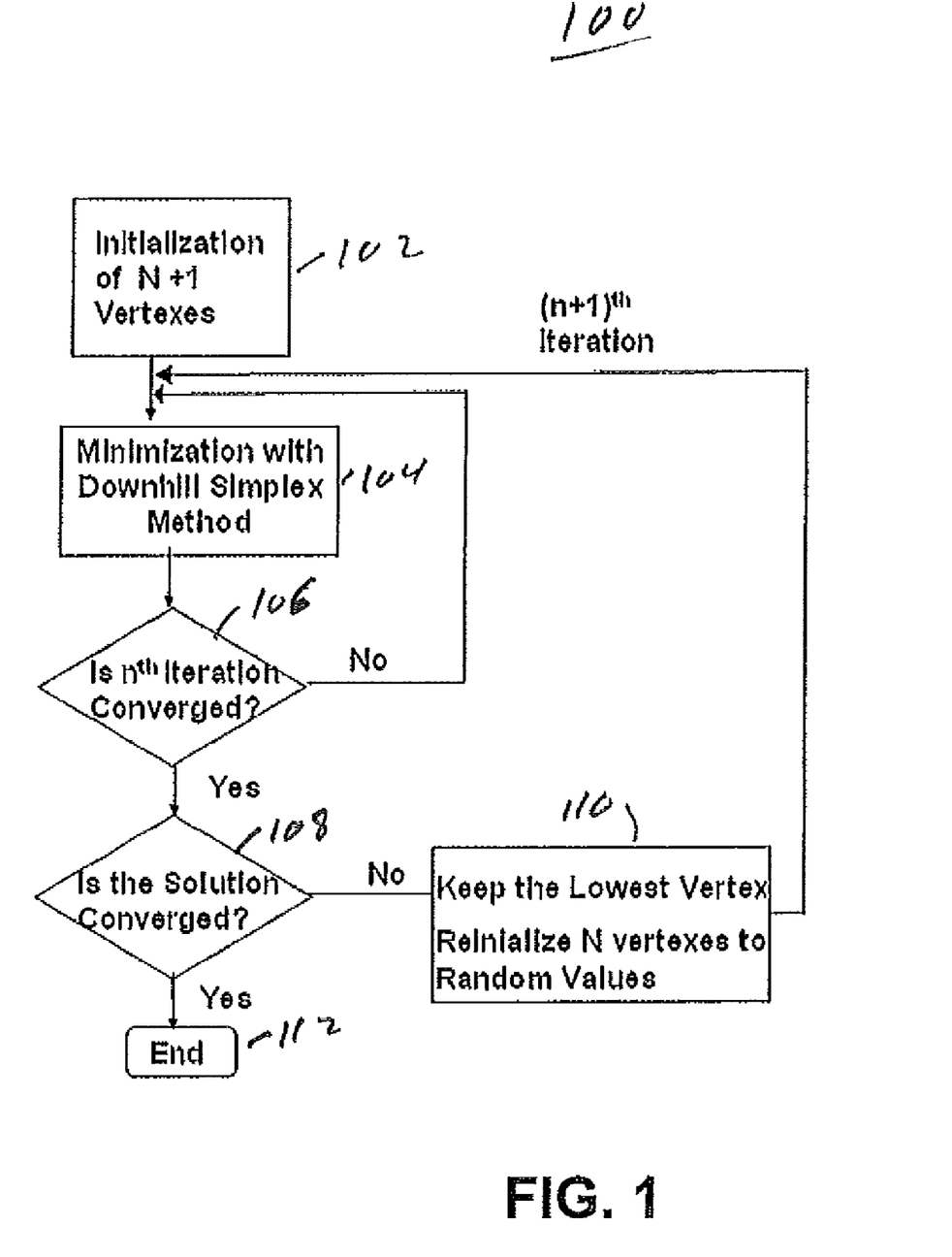
FIG. 1 is a flow chart illustrating a method of performing an embodiment of the present invention.

FIG. 1 is a flow chart illustrating a method of performing an embodiment of the present invention. The method 100 describes a calibration process, which contains double loops. The outer loop keeps the lowest vertex from performing a last iteration, re-initializes the rest of the vertexes to random values, and feeds them to the inner loop for minimization using, for example, a downhill simplex method. The method 100 is initiated at step 102 where the iteration begins at iteration 0. The N+1 vertexes are initialized with default values plus random variations.

The method 100 then proceeds to step 104 where the downhill simplex method is chosen to minimize the cost function. A simplex is a geometric figure that has N+1 vertexes in N-dimensional space. The downhill simplex method is based on a series of geometric operations that will bring the initial guess to a (local, at least) minimum. One advantage of the method is that it requires calculation of only function values, not derivatives. One of its disadvantages is that the process may stop at a local minimum, or may fail to start because the termination criteria is somehow falsely satisfied.

The method proceeds to step 106 where a determination is made as to whether the nth iteration has converged. If the nth iteration has not converged at step 106, the method 100 returns to step 104. If the nth iteration has converged at step 106, the method 100 proceeds to step 108.

At step 108, a determination is made as to whether the method 100 has globally converged. To overcome the disadvantages of the process stopping at a local minimum or not initiating because the termination criteria is falsely satisfied, the downhill simplex method is iteratively run and a determination as to whether the solution has converged e.g., there is a globally converged solution. If there is no globally converged solution, the method 100 proceeds to step 110.

At step 110, the method 100 combined with the inner loop of minimization using the downhill simplex method, the outer loop keeps the lowest point from the last iteration, and randomly sets the starting values of rest vertexes for the current iteration. The method 100 then returns to step 104.

At step 112, calibration ends when a pre-set threshold on the cost function is met or the pre-set number of iterations is achieved.

For a multi-pinhole system with one detector, the geometric parameters that may need calibrating can be expressed as a multi-dimension vector:

$$G=(f_i, p_i, d, m, e_u, \phi, \psi, \ldots), \quad (1)$$

Where $f_i$ is the focal length and $p_i$ is 2D (x, z) location of $i^{th}$ pinhole on the local pinhole plate coordinate, with i=1 to $N_p$, and $N_p$ is the number of pinholes on the plate, d, m, $e_u, \phi$, and $\psi$ are the pinhole to center-of-rotation distance (or radius-of-rotation, ROR), mechanical offset, electrical shift, tilt and twist of pinhole plate, respectively. It should be noted that symbols in bold font represent vectors, and symbols in plain font represent scalars. It should be appreciated by those skilled in the art that the results below can be applied to a system with multi-detectors.

Forward projection of a point-source at $x^j$ through $i^{th}$ pinhole may result in a forward-projected dot on the detector, if the point-source is within the aperture angle of that pinhole. Without being explicitly written out, its 2D coordinates can be denoted by $$\tilde{u}_i^j = FP_i(x^j) = \tilde{u}_i^j(G, x^j) \quad (2)$$

Where $FP_i(\ )$ denotes the forward projection through $i^{th}$ pinhole, j=1 to $N_s$ and $N_s$ is the number of point-sources. Collectively, a total of $N_t$ forward-projected (or predicted) dots are obtained, with $N_t \leq N_s N_p$. These forward-projected dots are denoted by $u_k^{fp}$, where k=1 to $N_t$.

From the measured projection data, assuming a total of $N_m$ dots are auto-segmented, their 2D coordinates can be written as $u_l^m$, where l=1 to $N^m$, sorted with a decreasing order in terms of dot brightness ($u_1^m$ is the brightest dot). It should be noted that $N_m$ takes into account all camera angles.

The agreement between the projected and measured 2D dots can be measured by the sum of the squared distances (SSD):

$$SSD(G, x^1, x^2, \ldots, x^{N_m}) = \sum_{l=1}^{N_m} \|u_l^m \leftrightarrow u_j^{fp}\|^2, \quad (3)$$

Where $u_j^{fp}$ is defined as the forward-projected dot that is nearest to $u_l^m$, and $\|u_l^m - u_j^{fp}\|^2$ is the squared distance between $u_j^{fp}$ and $u_l^m$. It should be noted that $u_j^{fp}$ is identified first for the brightest dot $u_1^m$, last for the dimmest $u_{N_m}^m$.

A cost function can be defined as $$RE(G, x^1, x^2, \ldots, x^{N_m}) = \sqrt{SSD/N_m}, \quad (4)$$

Where RE is the residual error, defined as the average distance between the predicted and measured 2D dots on detector. RE is expressed as a unit of detector pixel.

The calibration is turned into a multi-dimensional minimization problem:

$$P^{cal} = \underset{P \in \mathfrak{R}^N}{\operatorname{argmin}} RE(P), \quad (5)$$

Where $P=(G, x^1, x^2, \ldots, x^{N_m})$ N is the dimension of P, $P^{cal}$ is the calibrated results for the pinhole geometry and point-source 3D coordinates.

As previously described, at the very beginning (iteration 0), the N+1 vertexes were initialized with the default values plus random variations. The default values for the geometric pinhole parameters G are the nominal values from the mechanical design, and the default values of point-source locations ($x^1, x^2, \ldots, x^{N_m}$) are all set to 0 for simplicity, which corresponds to the center-of-rotation point.

For the $n^{th}$ iteration, the lowest vertex from $(n-1)^{th}$ iteration was inherited, and the starting values of the rest vertexes were set to the default values plus random variations, as in the iteration 0. This ensures the new iteration will not do worse than the last iteration, and it will continue to randomly search the parameter space for the minimum. It is guaranteed that the cost function will monotonically decrease with the iteration number. To finish the calibration, a threshold on the cost function is preset based on the accuracy of the imaging system, or in practice the number of iterations is preset based on the experience.

In calculation of the cost function RE, the measured dots are assigned to the nearest projected dots, in a natural order of the brightest first. Since the initial guess on the 3D locations of the point-sources could be far away from their real locations, the dots assignment could be totally wrong e.g., against the true correspondence between the dots at first, but as the minimization process is converging, the measured dots will be correctly assigned to the corresponding projected dots, at least for most dots, since the assignment is performed in each evaluation of the cost function.

EXPERIMENTS

A. Calibration Measurements

Figure 2A:
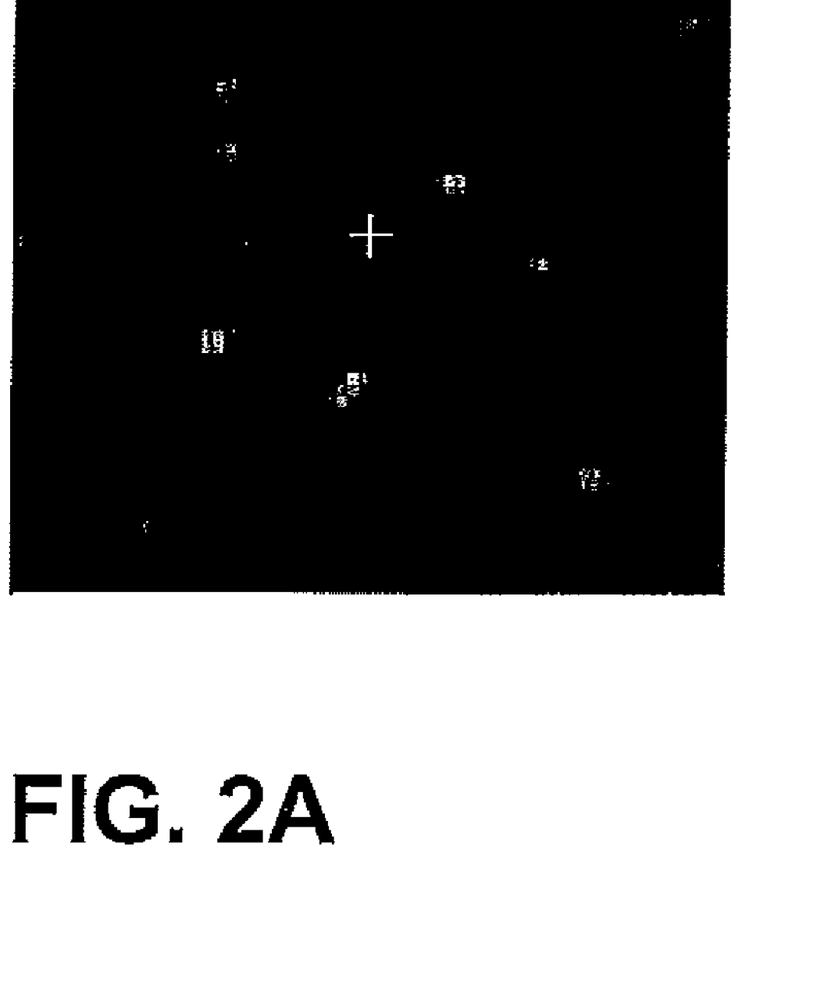
FIGS. 2A and 2B are images of raw projection data in accordance with an embodiment of the present invention.
Figure 2B:
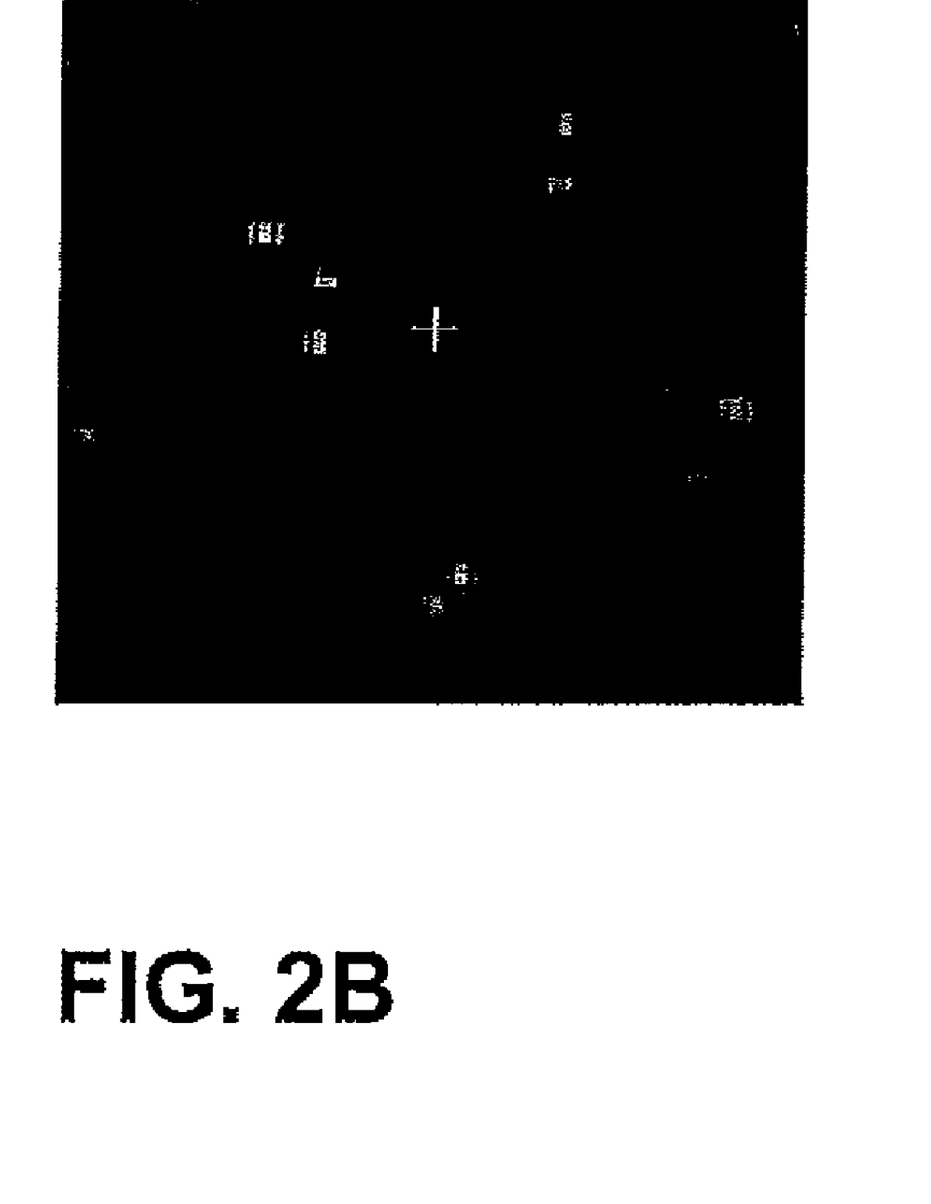

A cylindrical calibration phantom on which three Co-57 point-sources were mounted by tape was used to calibrate a five-pinhole SPECT system on a Siemens Inveon system. However, it should be appreciated by those skilled in the art that the invention is applicable to other manufactured systems. Each point-source has a nominal activity of 20 uCi, and a physical dimension of 1 mm Diameter and 0.5 mm thickness. Two detectors were deployed 180 degrees apart. Each of the two detectors acquired 30 projections through 360 deg rotation see FIGS. 2A and 2B. Specifically, FIG. 2A depicts an image of the raw projection data from the calibration acquisition for a first detector on a five pinhole system, and FIG. 2B depicts an image of the raw projection data from the calibration acquisition for a second detector on a five pinhole system.

Due to high accuracy in the manufacturing of the pinhole plate, the pinhole locations relative to each other were assumed to be accurately determined by their nominal values. The calibration parameters were reduced to, for each detector, focal length f, the radius-of-rotation d, mechanical offset $m=(m_x, m_z)$, where $m_x$ and $m_z$ are the trans-axial and axial offsets of the pinhole plate, respectively, electrical shift $e_u$, and the 3D coordinates of the three point-sources, $x^1, x^2, x^3$.

There were a total number of 19 independent variables to be optimized through the double-looped minimization process. The calibration was terminated after 1000 iterations, and the cost function RE was plotted vs. the iteration number. The residual error (RE), together with the calibration results, was compared after the 800$^{th}$ and 1000$^{th}$ iteration. The geometric parameters from the calibration were then used to reconstruct the point-source calibration data as shown in FIG. 1. For a comparison, the same data were also reconstructed with a set of nominal pinhole parameters from the mechanical design. Each reconstruction used 16 iterations of Ordered Subset Expectation Maximization (OSEM) with 5 subsets.

A mouse bone scan was performed using $^{99m}$Tc labeled HDP with the same five-pinhole plate right after the calibration scan, with the geometric pinhole parameters unchanged. Forty projections were acquired per detector over 360 degrees in 40 minutes. The data were reconstructed with the calibrated and nominal pinhole parameters. Each reconstruction used 15 iterations of OSEM with 10 subsets.

RESULTS

A. Results of Calibration

Figure 3:
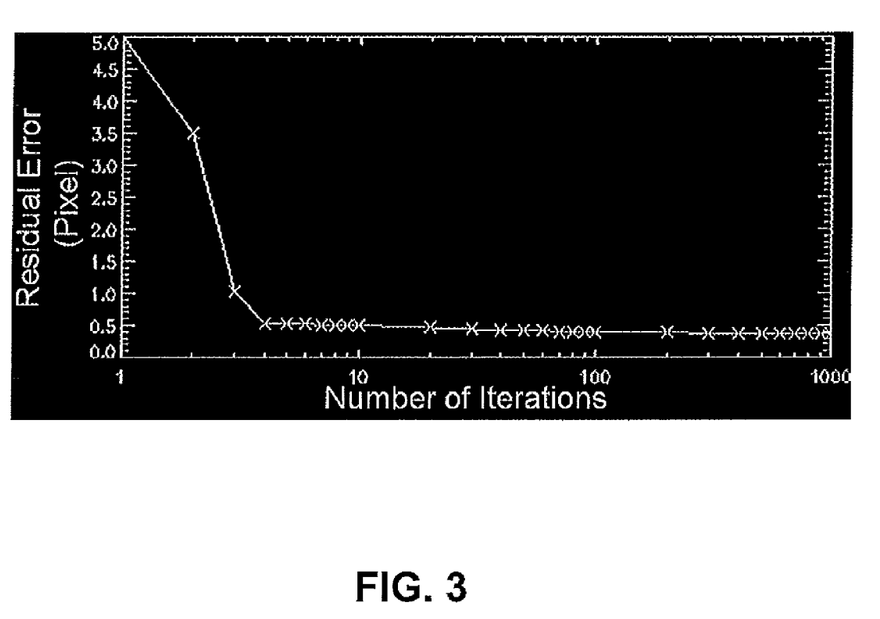
FIG. 3 is an image of a semi-log plot of a cost function in accordance with an embodiment of the present invention.

The cost function RE was observed monotonically decreasing with the iteration number, as shown in FIG. 3. FIG. 3 depicts the semi-log plot of the cost function–the residual error (RE) vs. the number of iterations. The calibration results from 800 and 1000 iterations are listed in Table 1. The residual error was reduced to less than one half (0.359) of the detector pixel after the 1000 iterations, showing that an accurate calibration had been achieved. It should be noted that the 3D coordinates of the three point-sources after calibration were far away from their initialization values. This illustrates that the method 100 requires no pre-knowledge of the markers' 3D locations. The whole calibration process (for 1000 iterations) takes about 15 minutes on an Intel PC with 1.66 GHz CPU.

Table 1 shows the results from the calibration. The residual error was reduced to one half of pixel after both 800 and 1000 iterations. It should be noted that the difference between 800 and 1000 iterations (0.361) and (0.359) is not great. It is possible to reduce the number of iterations and still accomplish favorable results. For example, a much lower amount of iterations can be performed and still fall within the scope of the present invention.

TABLE 1

| After Iteration # | Geometric Parameters Det 1 (mm) | Det 2 (mm) | Point-Source 3D Locations $x^1, x^2, x^3$ (mm) | RE (Pixel) |
|---|---|---|---|---|
| 0 (At Very Beginning) | f = 90, d = 30, $m_x$ = 0, $m_z$ = 0, $e_u$ = 0 | f = 90, d = 30, $m_x$ = 0, $m_z$ = 0, $e_u$ = 0 | (0, 0, 0), (0, 0, 0), (0, 0, 0) | 12.5 |
| 800 | f = 93.2, d = 30.4, $m_x$ = 0.773, $m_z$ = 0.100, $e_u$ = −0.00673 | f = 89.6, d = 29.7, $m_x$ = 0.573, $m_z$ = 0.201, $e_u$ = 0.568, | (6.38, −1.11, 3.73) (−1.18, 7.08, −13.6) (−9.17, −0.490, 10.2) | 0.361 |
| 1000 | f = 93.1, d = 30.4, $m_x$ = 0.763, $m_z$ = 0.0764, $e_u$ = 0.0328 | f = 90.1, d = 29.8, $m_x$ = 0.567, $m_z$ = 0.177, $e_u$ = 0.594 | (6.38, −1.11, 3.70) (−1.17, 7.09, 13.6) (−9.17, −0.488, 10.2) | 0.359 |

Figure 4A:
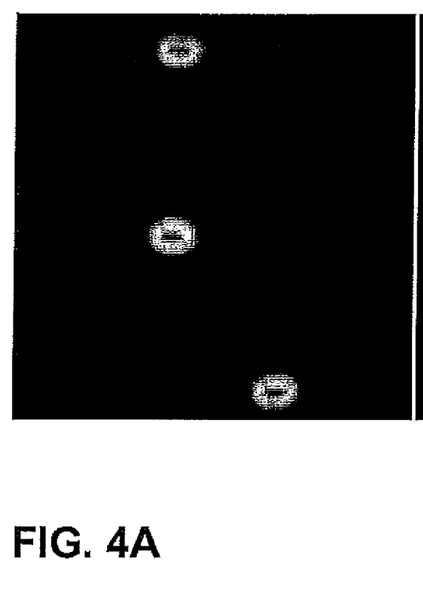
FIGS. 4A and 4B are images depicting reconstruction of SPECT calibration acquisitions in accordance with an embodiment of the present invention.
Figure 4B:
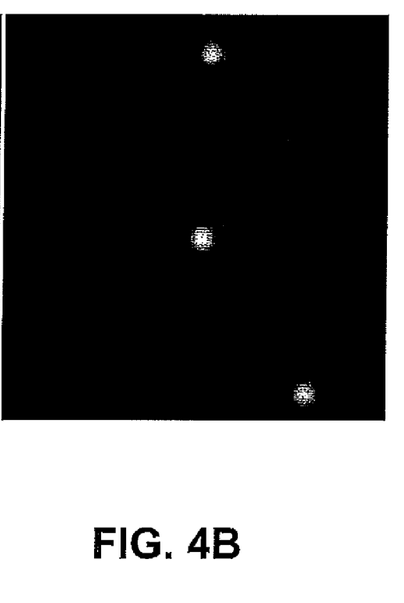

Images reconstructed from the SPECT calibration acquisition are shown in FIG. 4. On the reconstruction with the non-calibrated nominal pinhole parameters, the point-sources looked like "big" donuts FIG. 4A, while on the reconstruction with the calibrated parameters they were shown to be with the right shape and size FIG. 4B. In both FIGS. 4A and 4B, the reconstructed image was projected onto a plane for displaying all points.

Figure 5A:
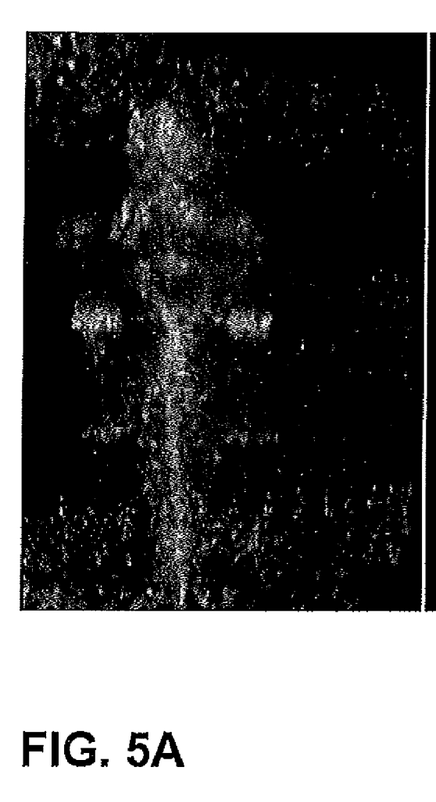
FIGS. 5A and 5B are images depicting reconstruction utilizing calibrated and non-calibrated parameters in accordance with an embodiment of the present invention.
Figure 5B:
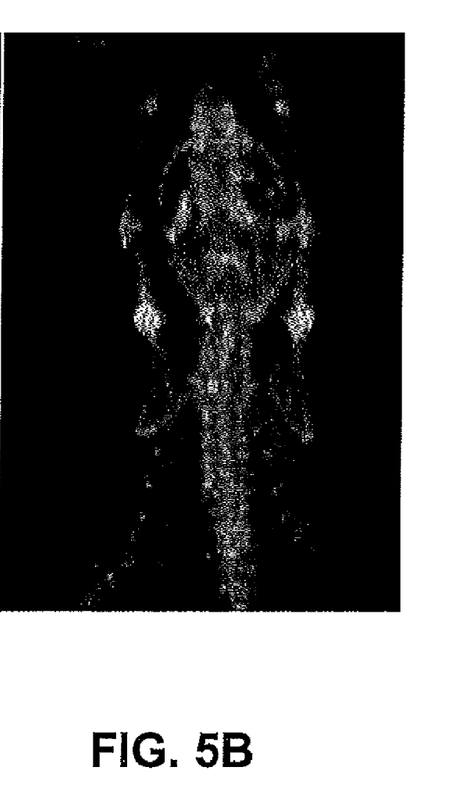

The results from reconstruction of the mouse bone scan were shown in FIG. 5. Reconstruction with the non-calibrated pinhole parameters resulted in a blurred image, which showed no details of the mouse head, due to lack of resolution FIG. 5A. Reconstruction with the calibrated pinhole parameters gave a clear image of the mouse head with good resolution FIG. 5B. In both FIGS. 5A and 5B, the maximum intensity projection (MIP) was displayed.

As in many other calibration methods, method 100 uses the SPECT calibration data only to localize the dots, and then discards information on the image intensities. In an embodiment of the present invention, a penalty term is added to the cost function, which penalizes large deviations of the predicted image intensities from the measured image intensities. This may help further constrain the non-linear multi-dimension minimization problem.

The present invention is generic in the sense that it has no strict requirements on calibration phantom, scan orbit, and calibration model, as long as most dots on the calibration scan can be clearly identified and can provide enough constraints to the problem (however, this sufficiency may have no easy answer for an arbitrary calibration model). It should be appreciated by those skilled in the art that the present invention can be used to calibrate X-ray CT, video cameras, and other imaging systems without departing from the scope of the present invention.

Embodiments of the present invention provide an iterative calibration method for multi-pinhole SPECT, which requires no pre-knowledge of markers' 3D coordinates and monotonically reduces the cost function. Using the disclosed method, a five-pinhole SPECT system was successfully calibrated.

Figure 6:
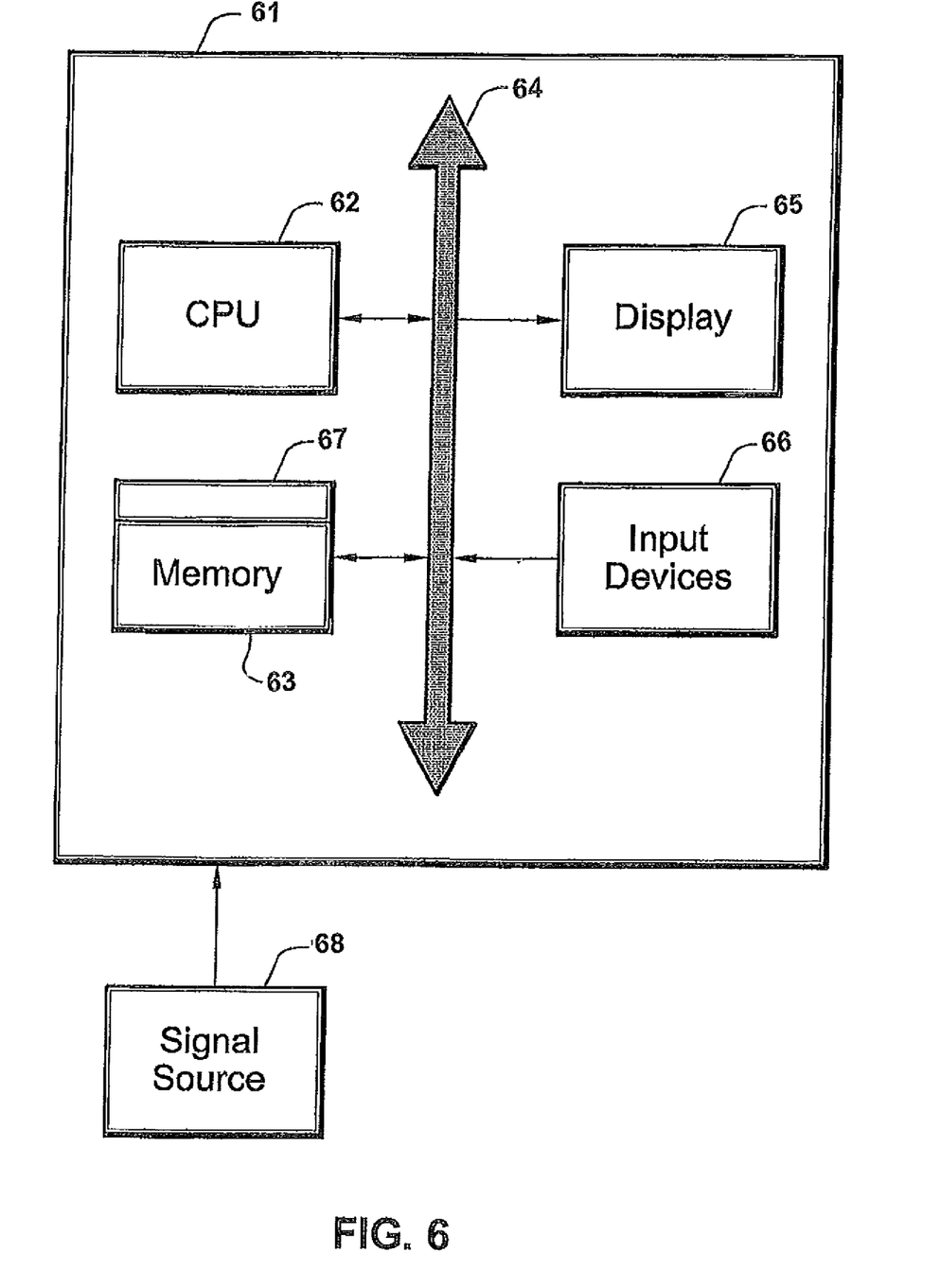
FIG. 6 is a block diagram of an exemplary computer system for implementing reconstructing single photon emission computed tomography data acquired with a pinhole collimator without pre-knowledge of 3D coordinates of point source markers in accordance with an embodiment of the present invention.

Referring now to FIG. 6, according to an embodiment of the present invention, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a gamma camera, detector, mouse and a keyboard. The support circuits can include circuits such as cache, power supplies, clock circuits, and a communication bus. The memory 63 can include random access memory (RAM), read only memory (ROM), disk drive, tape drive, hard drive, USB drive, CD, DVD, etc., or combinations thereof. The present invention can be implemented as a routine 67 that is stored in memory 63 and executed by the CPU 62 to process the signal from the signal source 68. As such, the computer system 61 can be a general purpose computer system that becomes a specific purpose computer system when executing the routine 67 of the present invention or a SPECT system, SPECT/CT system, PET/CT system or combinations thereof.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for reconstructing single photon emission computed tomography data acquired with a pinhole collimator without pre-knowledge of 3D coordinates of point source markers, the method comprising:
   reiteratively applying a downhill simplex process to determine a first parameter and a second parameter;
   keeping a lowest vertex from a previous iteration;
   randomly resetting starting values for rest vertexes for a current iteration, wherein the lowest vertex is prevented from performing a last iteration;
   determining whether at least one of a first threshold and a second threshold has been reached, wherein the first threshold comprises a cost function value and the second threshold comprises a predetermined number of iterations of the downhill simplex process;
   acquiring projection data from the first parameter;
   determining locations of 2D data from the projection data of the first parameter; and
   estimating the second parameter by fitting the forward projected data locations to the measured data locations.

2. The method of claim 1, wherein the first parameter comprises estimated 3D locations of the calibration markers and the second parameter comprises a geometric parameter.

3. The method of claim 1, wherein the cost function includes a penalty term.

4. The method of claim 3, wherein the penalty term comprises penalizing deviations above a third threshold value of predicted image intensity values to measured image values.

5. The method of claim 1, wherein the cost function comprises a difference in distance between measured dots and projected dots.

6. The method of claim 1, wherein the cost function monotonically decreases with the number of iterations.

7. The method of claim 2, wherein the geometric parameter comprises:
   a focal length.

8. The method of claim 2, wherein the geometric parameter comprises:
   a radius of rotation.

9. The method of claim 2, wherein the geometric parameter comprises:
   a pinhole location.

10. The method of claim 2, wherein the geometric parameter comprises at least one of:
    a pinhole plate transaxial offset, a pinhole plate axial offset, a detector center-of-rotation offset, a tilt of the pinhole plate and a twist of the pinhole plate.

11. The method of claim 1, wherein the pinhole collimator comprises a multi-pinhole collimator.

12. A single photon emission computed tomography system comprising:
    a machine-readable storage medium; and
    a system controller connected to and in communication with a gamma camera detector provided with a pinhole collimator and the machine-readable storage medium, wherein the machine-readable storage medium is encoded with a computer program code such that, when the computer program code is executed by the system controller, the system controller performs a method for reconstructing single photon emission computed tomography data acquired with a pinhole collimator without pre-knowledge of 3D coordinates of point source markers, the method comprising:
    reiteratively applying a downhill simplex process to determine a first parameter and a second parameter;
    keeping a lowest vertex from a previous iteration;
    randomly resetting starting values for rest vertexes for a current iteration, wherein the lowest vertex is prevented from performing a last iteration;
    determining whether at least one of a first threshold and a second threshold has been reached, wherein the first threshold comprises a cost function value and the second threshold comprises a predetermined number of iterations of the downhill simplex process;
    acquiring projection data from the first parameter;
    determining locations of 2D data from the projection data of the first parameter; and
    estimating the second parameter by fitting the forward projected data locations to the measured data locations.

13. The system of claim 12, wherein the pinhole collimator is a multi-pinhole collimator having more than one pinhole.

14. The system of claim 12, wherein the first parameter comprises estimated 3D locations of the calibration markers and the second parameter comprises a geometric parameter.

15. The system of claim 12, wherein the cost function includes a penalty term.

16. The system of claim 14, wherein the penalty term comprises penalizing deviations above a third threshold value of predicted image intensity values to measured image values.

17. The system of claim 12, wherein the cost function comprises a difference in distance between measured dots and projected dots.

18. The system of claim 12, wherein the cost function monotonically decreases with the number of iterations.

19. The system of claim 14, wherein the geometric parameter comprises at least one of a focal length, a radius of rotation, a pinhole location, a pinhole plate transaxial offset, a pinhole plate axial offset, a detector center-of-rotation offset, a tilt of the pinhole plate and a twist of the pinhole plate.

20. A machine-readable storage medium, tangibly embodying a program of instructions executable by a processor to perform method steps for reconstructing single photon emission computed tomography data acquired with a pinhole collimator without pre-knowledge of 3D coordinates of point source markers, the method comprising:

reiteratively applying a downhill simplex process to determine a first parameter and a second parameter;

keeping a lowest vertex from a previous iteration;

randomly resetting starting values for rest vertexes for a current iteration, wherein the lowest vertex is prevented from performing a last iteration;

determining whether at least one of a first threshold and a second threshold has been reached, wherein the first threshold comprises a cost function value and the second threshold comprises a predetermined number of iterations of the downhill simplex process;

acquiring projection data from the first parameter;

determining locations of 2D data from the projection data of the first parameter; and estimating the second parameter by fitting the forward projected data locations to the measured data locations.

* * * * *